April 29, 1930.  S. M. PINELES  1,756,066
DOG RACING APPARATUS
Original Filed Aug. 29, 1927   4 Sheets-Sheet 1
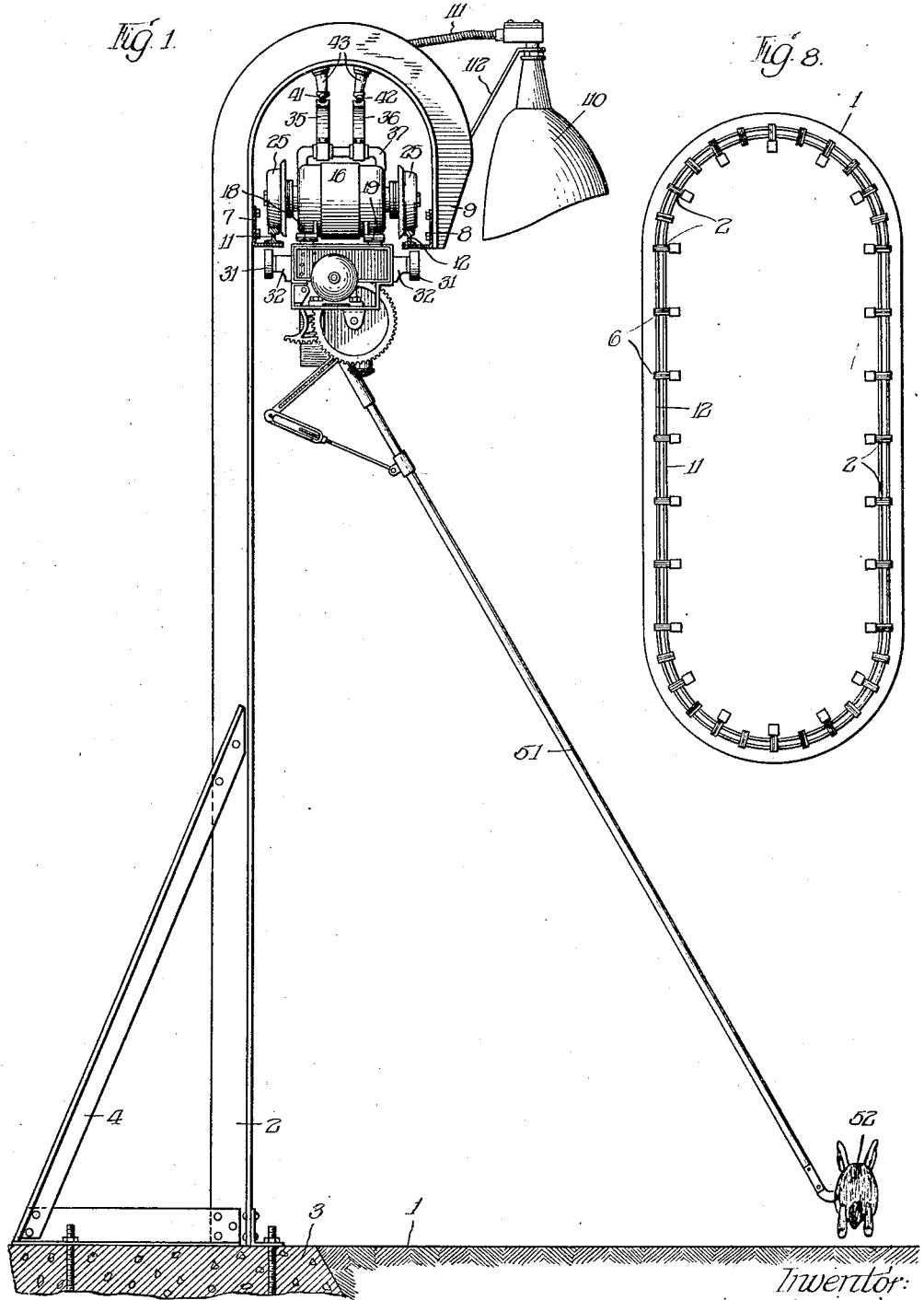

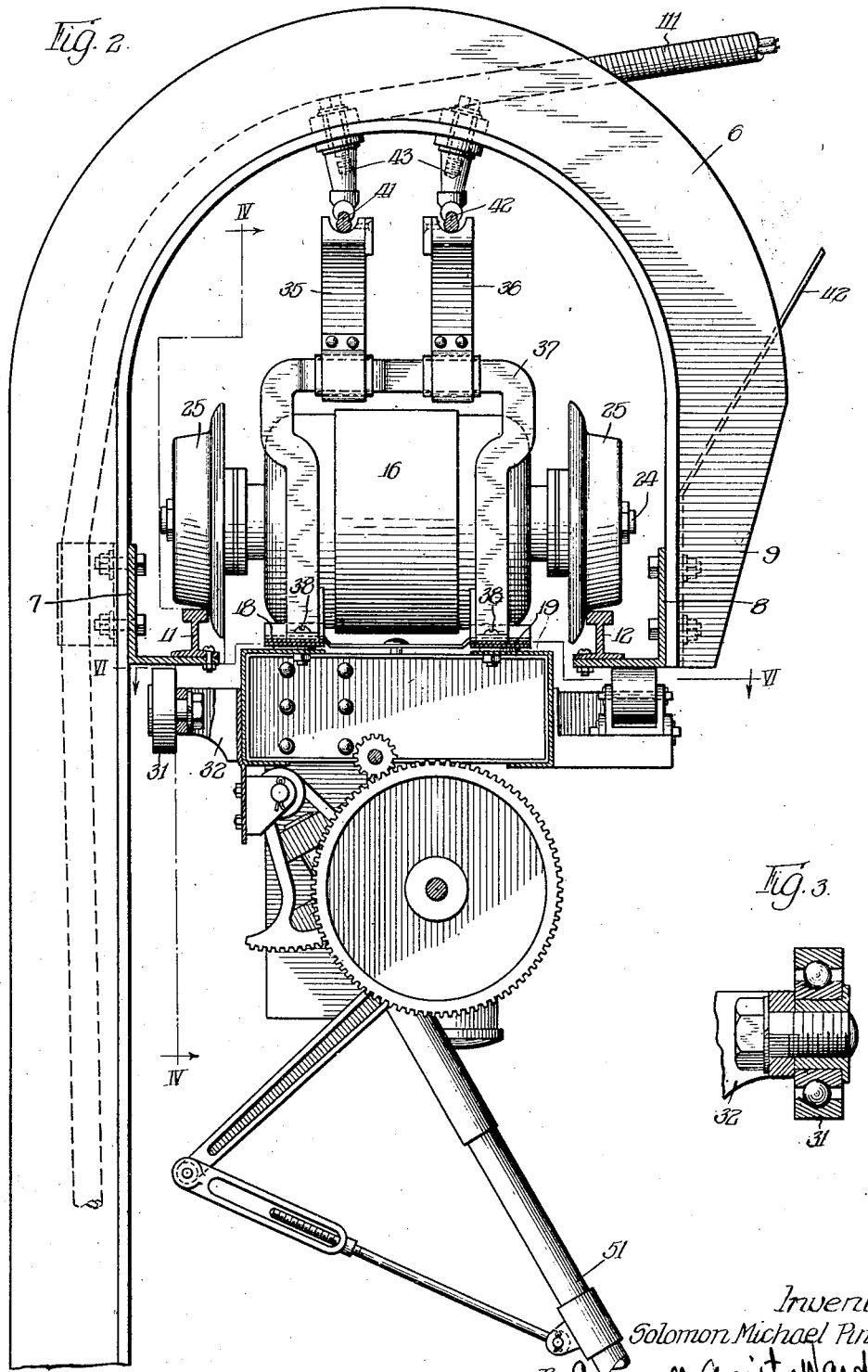

April 29, 1930.  S. M. PINELES  1,756,066
DOG RACING APPARATUS
Original Filed Aug. 29, 1927  4 Sheets-Sheet 3
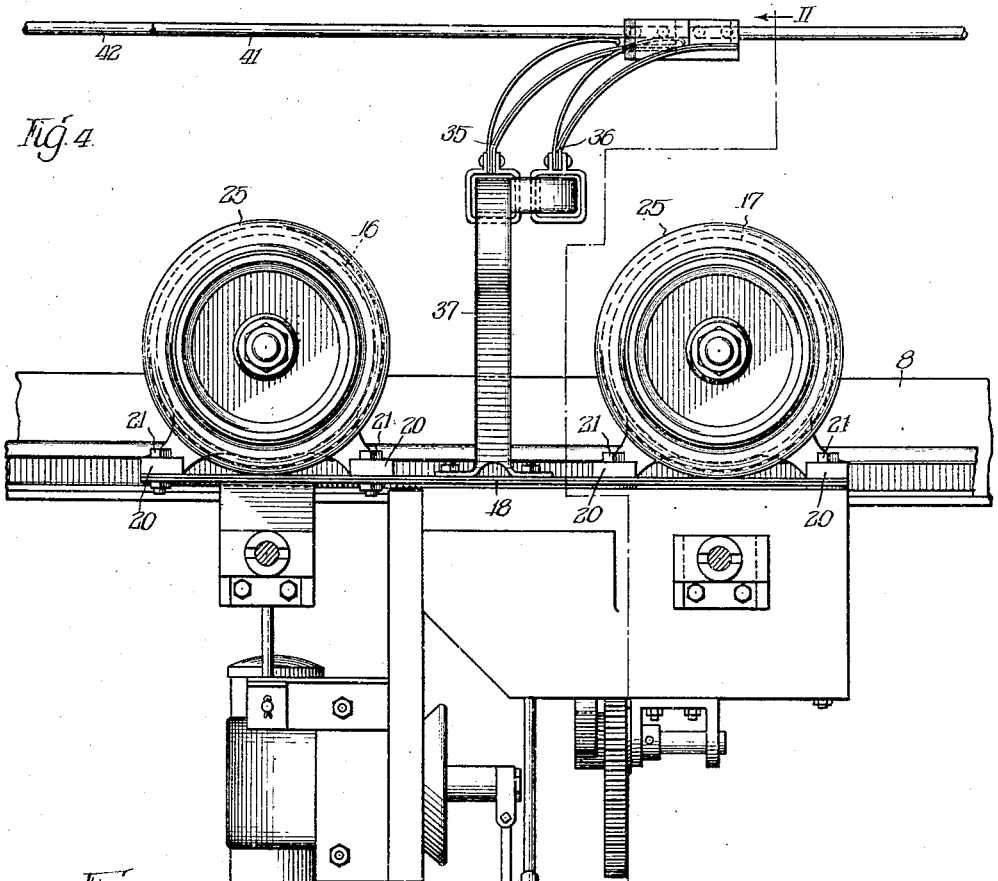
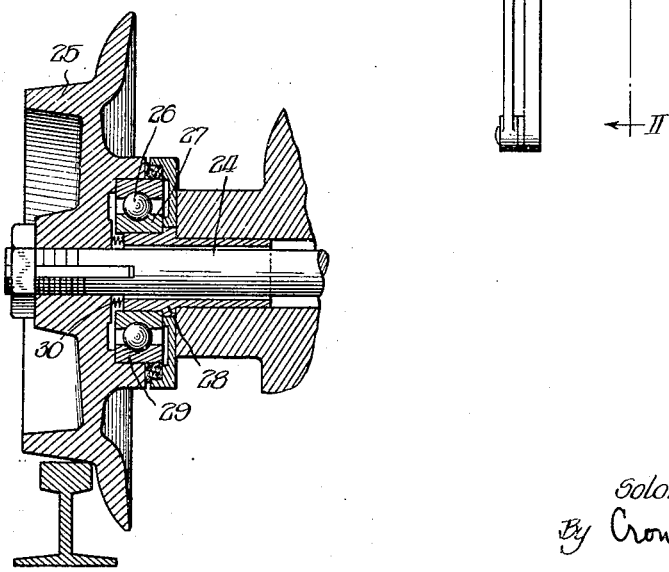
Inventor:
Solomon Michael Pineles,
By Cromwell, Greist & Warden
Attys.

April 29, 1930.  S. M. PINELES  1,756,066
DOG RACING APPARATUS
Original Filed Aug. 29, 1927   4 Sheets-Sheet 4
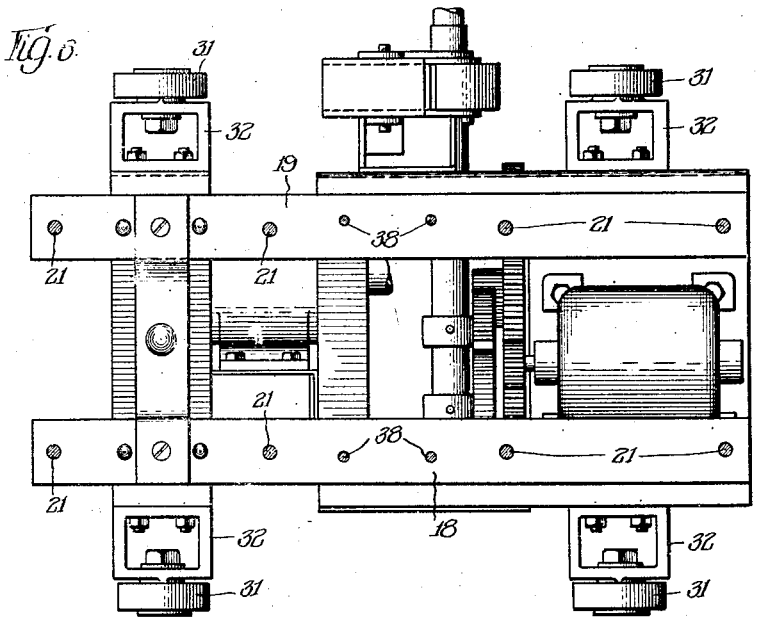
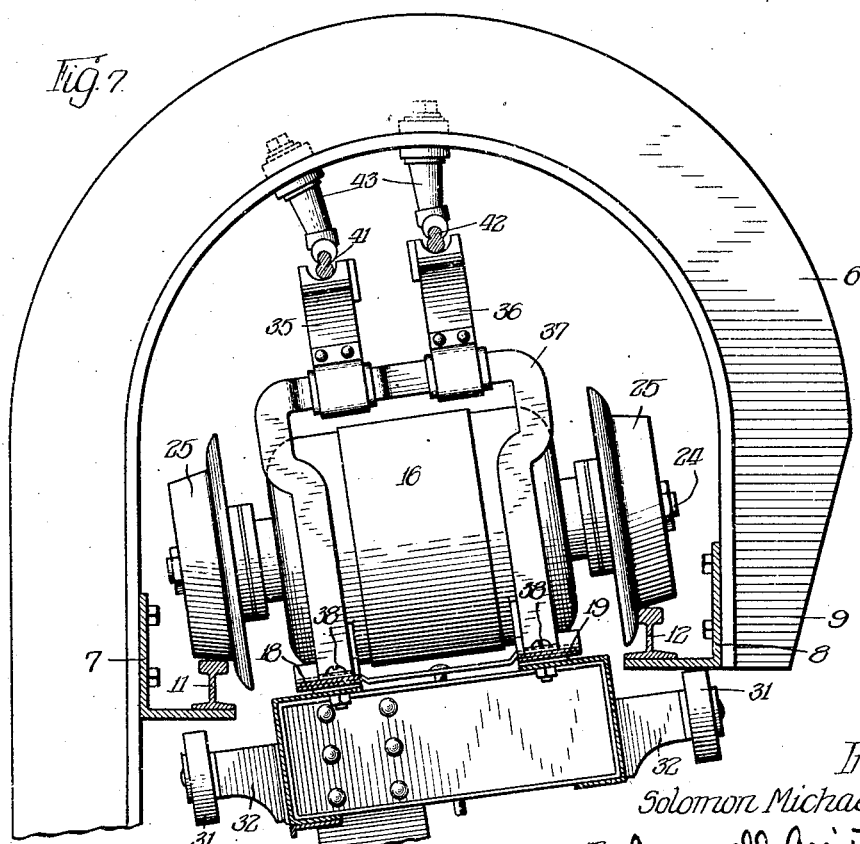
Inventor:
Solomon Michael Pineles,
By Cromwell, Greist & Warden
Attys.

Patented Apr. 29, 1930

1,756,066

UNITED STATES PATENT OFFICE

SOLOMON MICHAEL PINELES, OF CHICAGO, ILLINOIS, ASSIGNOR TO HARRY B. STAVER, OF CHICAGO, ILLINOIS

DOG-RACING APPARATUS

Original application filed August 29, 1927, Serial No. 216,246. Divided and this application filed November 21, 1927. Serial No. 234,570.

This invention relates to dog racing apparatus and it has among its objects the provision of an improved apparatus for carrying an artificial lure in front of the dogs along a race track.

The objects of the invention will be best understood from the following description of exemplifications thereof, reference being had to the accompanying drawings, wherein Fig. 1 is a transverse sectional view of a race track embodying the invention;

Fig. 2 is a transverse sectional view through the lure carriage and the associated portions of the rail track structure along line II—II of Fig. 4;

Fig. 3 is a sectional view through the guide roller of the lure carriage;

Fig. 4 is a side elevation view of the lure carriage and the associated rail structure taken along the line IV—IV in Fig. 2, the lure arm being in lifted position;

Fig. 5 is a sectional view of a carriage supporting wheel and the mounting thereof;

Fig. 6 is a plan view of the lure carriage structure along the line VI—VI of Fig. 2;

Fig. 7 is a view similar to Fig. 2 showing the alignment of the carriage when passing over a curved portion of the track; and Fig. 8 is a plan view of the racing track.

The lure drive according to the present invention distinguishes from those of the prior art in that it provides a simple and highly efficient driving carriage for the lure which, though of small size and light weight, is capable of operating at very high speeds of the order of fifty miles per hour and more. The improved lure carriage is provided with a very simple electrically operated mechanism for moving the lure from an operative to an inoperative position which is so arranged as to permit imitation of jumping movement over hurdles and the like. There is also provided an improved overhead rail track system for operating the carriage thereon which, with a minimum of material, secures support of utmost rigidity and stiffness for the rails upon which the lure carriage is run.

Referring to the drawing, an oval racing track 1 as shown in Fig. 8 has disposed along the inner side thereof a series of posts 2, the posts being formed of T-shape angle iron secured to suitable foundation blocks 3, of concrete for instance, and stiffened by braces 4 against the foundation blocks. The upper end of each post is bent outwardly towards the track 1 and forms an arch 6. Extending between the posts within the inner space of the arches 6 are two girders 7 and 8 formed of angle iron, one girder 7 being suitably secured to the upper ends of the upstanding posts 2 and the other girder being secured to the bent-over portion 9 of the posts.

The angle irons 7 and 8 thus define an oval runway along the track and on the horizontal portions of said angle irons there are supported two rails 11 and 12, the rails being suitably secured to the angle irons as by means of bolts or welding. A rail track is thus obtained comprising two spaced rails supported on an overhead structure with a free space between the rails.

A carriage is arranged to run on this rail track, the truck of the carriage consisting merely of two driving motors 16 and 17 and a pair of straps 18, 19, to which the two motors are secured. The motors are of the ordinary commercial form having each a familiar frame with four legs 20 at the base thereof. These legs are suitably connected, as by means of bolts 21, to the straps 18 and 19. The straps are made of an elastic material such as tempered steel in order to permit play between the motor in the front portion and the motor in the rear portion and adjustment of the individual wheels to the track while tending to maintain all four wheels on the track and avoiding slippage of one or the other wheel. The motor frames with the straps 18, 19, running therebetween thus constitute a very simple truck frame without requiring any complicated structures, full use being made of the frame of the motors.

Each of the motors 16, 17 has directly mounted on the shaft stubs 24 extending on both sides thereof flanged wheels 25 adapted to engage the rails 11 and 12 to run thereon and be guided thereby along the track. The shafts 24 with the associated wheels 25 are mounted on ball bearings 26 as illustrated in Fig. 5, the inner race 27 of the ball bearings being held on a sleeve member 28 which is secured to the frame of the motor in place of the ordinary sleeve bearing, the outer race 29 of the bearing being secured to the hub of the wheel 25. Spring washers 30 between the end of the sleeve 28 and the adjacent portion of the wheel 25 serve to establish a good conducting connection to the wheels so as to provide a connection between some of the terminals of the motor and the rails which are used as one of the supply lines, as will be more fully described hereinafter.

Through utilization of a carriage of such simple structure as described above, which consists essentially only of the two motors and a very light but firm frame connection therebetween, it is possible to secure high operating speed with relatively small motors. Thus, a speed of fifty to sixty miles per hour may be obtained with the motors having each a rating of only three-quarters of a horsepower. In order to hold the carriage on the track and prevent jumping on account of its light weight and high operating speed, the carriage is provided with a plurality of guide rollers 31 supported on suitable brackets 32 extending from underneath the side straps 18 and 19, the rollers underlying the rails 11 and 12 and the angle irons 7 and 8 so as to oppose upward movement of the carriage in a direction away from the track. Either one or two pairs of rollers may be provided, but in the preferred construction two pairs of rollers are used disposed underneath the two pairs of wheels 25 of the front motor 16 and the rear motor 17.

In addition to the electric supply current connection through the grounded rails 11, 12 and the wheels 25 of the carriage there are provided two additional supply connections in the form of a pair of collector forks 35, 36, that are insulatingly supported side by side on an arched bracket 37 that is mounted on the two side straps 18, 19 by means of bolts 38. The collector members 35 and 36 are arranged to cooperate with two trolley conductors 41, 42 that are insulatingly mounted on suitable insulators 43 that are secured to the upper portion of the arches 6, the conductors running along the track so as to supply current to the collector members 35 and 36.

Suspended from the lure carriage is a lure mechanism including a lure arm 51 carrying at its end a lure 52. The construction of the lure mechanism is described and claimed in the co-pending application, Serial No. 216,246, filed August 29th, 1927, of which this application is a division, assigned to the assignee of the present invention, and need not be described more in detail.

On the curved portions of the track the outer rail 12 is supported at a higher level than the inner rail 11 to form a banked rail track, as shown in Fig. 7, in order to reduce the lateral strain imposed by the carriage by reason of the centrifugal forces. The individual posts 2 may also be used for supporting reflectors 110, there being provided conduits 111 running along the posts and extending beyond the upper portions thereof, the ends of the conduits with the reflectors 110 being supported on suitable braces 112 that are anchored on the arches.

Due to the employment of direct motor-drive by mounting the four wheels of the carriage directly on the shafts of the two driving motors it is possible to obtain a high driving speed and quick acceleration, such as is required in dog racing apparatus with an exceedingly small total weight of the carriage. In this way the cost of the equipment for dog racing tracks and of the operation and maintenance of the same is cut down to a fraction of the cost of prior art apparatus. In the improved apparatus of my invention the entire weight of the carriage is utilized to obtain the attractive effort since both the front wheels, as well as the rear wheels of the carriage, are motor driven. The employment of a small light weight driving carriage makes it also possible to avoid the expensive rail structures used in the prior art dog racing grounds. With the improved carriage, a relatively simple and inexpensive runway on which the carriage is guided, is all that is necessary for properly operating the race track. The utilization of small motors also reduces to a minimum the current consumption required to drive and operate the carriage. The entire structure is light and may be readily dismantled and installed, the small weight of the carriage permitting it to be transported readily from place to place.

Many modifications of the invention will suggest themselves to those skilled in the art and it is, accordingly, desired that the appended claims be given a broad construction commensurate with the scope of the invention.

I claim:

1. In an animal racing course in which dogs are induced to run behind a lure propelled along said course, a rail track comprising two spaced rails, a carriage adapted to run on said rails, said carriage comprising two motors disposed in the direction transverse to said rails, each motor having a shaft and two rail wheels on said shaft in engagement with said rails, and frame members joining said motors and utilizing the frames of said motors as a part of the carriage structure.

2. In an animal racing course in which dogs are induced to run behind a lure propelled along said course, a rail track comprising two spaced rails, a carriage adapted to run on said rails, said carriage comprising two motors disposed in the direction transverse to said rails, each motor having a stator and a rotor, a shaft extending on both sides of said rotor, rail wheels on each end of said shaft, said wheels engaging said rails and a resilient connection between the stators of said two motors constituting in conjunction with said stators the truck of said carriage.

3. In an animal racing course of the type wherein a lure is propelled along a racing track to induce dogs to run therebehind, a runway disposed adjacent to said racing track and a lure carriage adapted to run on said runway and be guided thereby along said track, said carriage comprising two motors disposed in the direction transverse to said runway, each motor having a driving shaft and two wheels on the opposite ends of said shaft, said wheels being in engagement with said runway to support said carriage and drive the same, and frame members joining said motors and utilizing the frames of said motors as a part of the carriage structure.

4. In an animal racing course of the type where dogs are induced to run behind a lure along a racing track, a runway disposed adjacent to said track along the same, a carriage adapted to be propelled on said runway and be guided thereby along said track, and a lure carried by said carriage over said race track, said carriage comprising two motors disposed one in front of the other in direction transverse to said runway, each motor having a stator and a rotor, a shaft extending on both sides of said rotor, and a pair of driving wheels mounted on the two ends of each shaft, said two pairs of wheels engaging said runway to support and drive said carriage, and a resilient connection between the stators of said two motors constituting in conjunction with said stators the truck of said carriage.

In testimony whereof I have hereunto subscribed my name.

SOLOMON MICHAEL PINELES.